US010957198B1

(12) United States Patent
Hao

(10) Patent No.: US 10,957,198 B1
(45) Date of Patent: Mar. 23, 2021

(54) SYSTEM AND METHOD FOR DETERMINING PARKING SPACE

(71) Applicant: INDUSTRIAL TECHNOLOGY RESEARCH INSTITUTE, Hsinchu (TW)

(72) Inventor: Yu-Hsiang Hao, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/724,549

(22) Filed: Dec. 23, 2019

(51) Int. Cl.
*G06K 9/00* (2006.01)
*G08G 1/14* (2006.01)

(52) U.S. Cl.
CPC .................................... *G08G 1/14* (2013.01)

(58) Field of Classification Search
CPC ........... G08G 1/14; G08G 1/143; G08G 1/146
See application file for complete search history.

(56) References Cited

U.S. PATENT DOCUMENTS 9,508,260 B2 11/2016 Shaik
2005/0002544 A1* 1/2005 Winter ..................... G08G 1/14 382/104
2006/0267799 A1* 11/2006 Mendelson .............. G08G 1/14 340/932.2
2009/0088959 A1 4/2009 Mori et al.
2016/0125736 A1* 5/2016 Shaik ....................... G08G 1/14 701/23
2017/0267233 A1* 9/2017 Minster .................. B62D 15/02
2018/0129883 A1* 5/2018 Zhang .................. G06K 9/4661
2020/0175870 A1* 6/2020 Oh ........................... G06F 3/14

FOREIGN PATENT DOCUMENTS

CN 105608924 5/2016
CN 106097758 11/2016
CN 109219760 1/2019
(Continued)

OTHER PUBLICATIONS

True, "Vacant Parking Space Detection in Static Images", 2007.
(Continued)

*Primary Examiner* — Hongmin Fan
(74) *Attorney, Agent, or Firm* — Amin, Turocy & Watson, LLP

(57) ABSTRACT

A system and a method for determining a parking space are provided. The method includes: obtaining parking space information within a range where a vehicle is located, the parking space information including parking lot map data; analyzing an object in individual parking space in the parking space information and generating object information of the object of the individual parking space; and using the object information and the parking space information to calculate a spatial relationship between the object in the individual parking space and a parking space where the object is located, and determining that the parking space is an available parking space if the spatial relationship satisfies vehicle body information of the vehicle. Therefore, the vehicle can determine an available parking space before passing it, and can further choose a better parking space.

17 Claims, 11 Drawing Sheets

(56) References Cited

FOREIGN PATENT DOCUMENTS

| | | |
|---|---|---|
| TW | 201836884 | 10/2018 |
| WO | 2017/072955 | 5/2017 |

OTHER PUBLICATIONS

Fabian, "An algorithm for parking lot occupation detection", Computer Information Systems and Industrial Management Applications; 2008; pp. 165-170.
Delibaltov, et al. "Parking lot occupancy determination from lamppost camera images", Intelligent transportation systems—(itsc), 2013 16th international ieee conference on, IEEE; 2013; pp. 2387-2392.
Thornton, et al. "Automated parking surveys from a lidar equipped vehicle", Transportation Research Part C; 2014; 39, 23-35.
Houben, et al. "On-Vehicle Video-Based Parking Lot Recognition with Fisheye Optics", Proceedings of the 16th International IEEE Annual Conference on Intelligent Transportation Systems; 2013; pp. 7-12.
Taiwanese Office Action for Taiwanese Patent Application No. 108147181 dated Dec. 9, 2020.

* cited by examiner

SYSTEM AND METHOD FOR DETERMINING PARKING SPACE

BACKGROUND

1. Technical Field

This disclosure relates to parking space determining techniques, and, more particularly, to a system and a method for determining a parking space.

2. Description of Related Art

In nowadays automatic or assisted parking, a parking space can be detected generally by a distance sensing method and an image identifying method. The distance sensing method is implemented by an ultrasonic wave sensor or a radar wave sensor, which, however, has a problem in determining obstacles and cannot detect obstacles until a vehicle approaches to a parking space. The image identifying method captures images, determines whether a parking space exists through the parking lines thereof, and then determines whether the parking space is an available parking space. The image identifying method cannot determine the available parking space unless the vehicle approaches to it.

It is known from the above that the conventional parking space determining techniques cannot work unless a vehicle drives by or approaches to a parking space. As a result, only the parking space that is passed or neighbored by the vehicle can be determined, which means not all the available parking space are determined, and it is unknown whether there is a better available parking space.

Therefore, how to solve the problems of the prior art is becoming an urgent issue in the art.

SUMMARY

The disclosure provides a system for determining a parking space, comprising: a parking space information module configured for obtaining parking space information within a range where a vehicle is located, the parking space information comprising parking lot map data; an object analysis module configured for receiving the parking space information, analyzing an object within individual parking space in the parking space information, and generating object information of the object within the individual parking space; and a processing module configured for receiving the object information, using the object information and the parking space information to calculate a spatial relationship between the object within the individual parking space and a parking space where the object is located, and determining that the parking space is an available parking space if the spatial relationship satisfies the vehicle body information of the vehicle.

The disclosure also provides a method for determining a parking space, comprising: obtaining parking space information within a range where a vehicle is located, the parking space information comprising parking lot map data; analyzing an object in individual parking space in the parking space information and generating object information of the object of the individual parking space; and using the object information and the parking space information to calculate a spatial relationship between the object in the individual parking space and a parking space where the object is located, and determining that the parking space is an available parking space if the spatial relationship satisfies vehicle body information of the vehicle.

In the system and the method for determining a parking space according to the disclosure, the parking space information within a range where a vehicle is obtained, whether an object is in the parking space is determined, whether the parking space is an available parking space is determined, and a better available parking space is determined based on the ranking result of all the available parking space from evaluation scores and time evaluation. Therefore, the vehicle can determine the available space before passing or approaching to it, and can find out a better one of a plurality of available parking spaces to park.

DETAILED DESCRIPTION

Figure 1:
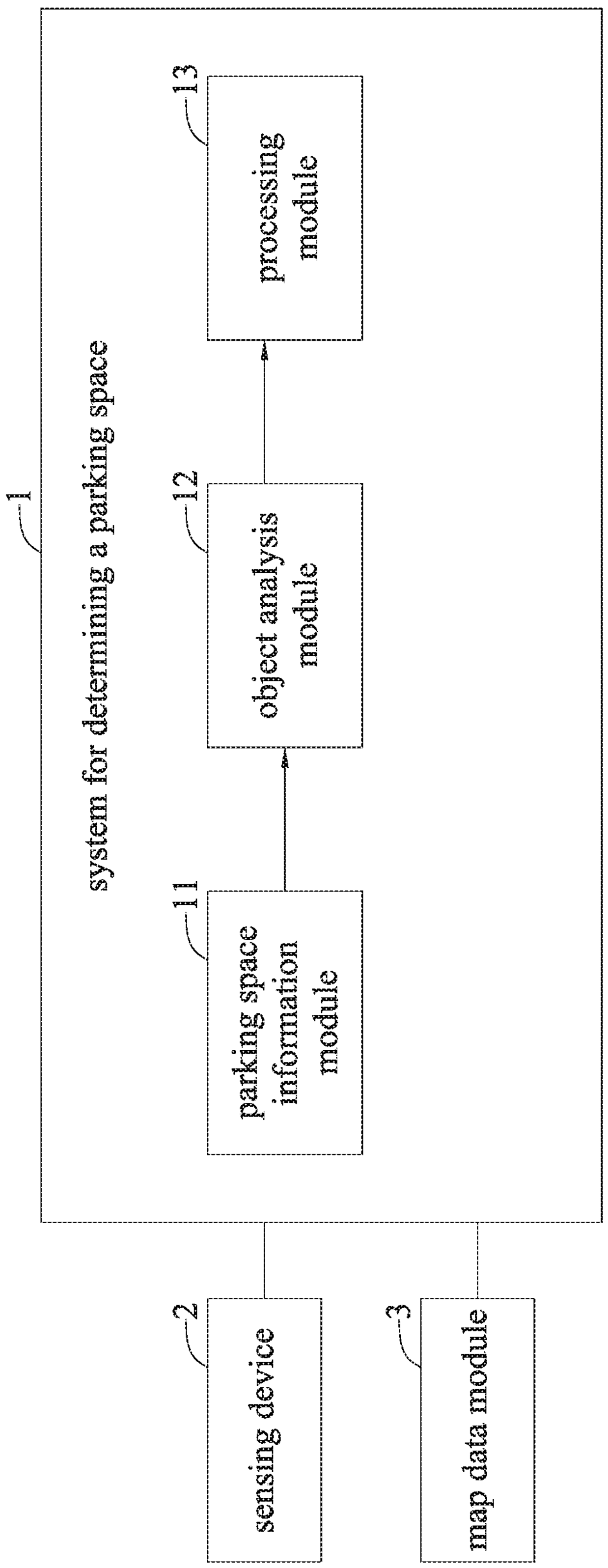
FIG. 1 is a functional block diagram of a system for determining a parking space according to the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a functional block diagram of a system 1 for determining a parking space according to the disclosure. The system 1 can be applied to searching a parking lot for an available parking space, mounted to a vehicle, and implemented by an electronic device having a memory and a processor that executes calculation and analysis. External data can be downloaded or pre-loaded to the system 1. With a moving vehicle as a center of a range, the system 1 searches and analyzes parking space states within the range in real time, and finds out the best available parking space. The system 1 comprises a parking space information module 11, an object analysis module 12 and a processing module 13.

The parking space information module 11 obtains parking space information within a range where a vehicle is located. With a vehicle as a center of a range, the disclosure takes into consideration of a certain range with a vehicle as its center. As a vehicle enters a parking field (e.g., a parking tower) and searches for a parking space, the vehicle first obtains the parking space information of the parking lot from the map data module 3 and the parking space information surrounding the vehicle from a sensing device 2, to determine whether there are available parking spaces within the searched range.

In an embodiment, the parking space information can be from the external map data module 3. In another embodiment, the parking space information is pre-loaded parking lot map data. In order to select the parking space smoothly, the system 1 for determining a parking space can be pre-loaded with the parking lot map data and stores the parking lot map data in the parking space information module 11. Knowing the distribution state of the parking spaces in the parking lot and related information in advance is advantageous for the processing module 13 to analyze the parking space information and the object information. In an embodiment, the distribution states of the parking spaces in the parking lot and related information include the position coordinates of the parking spaces, left and right neighboring parking grids, single-sided neighboring parking grid, an independent parking grid, a distance from vehicle exit/entrance, a distance from pedestrian exit/entrance, which floor that the vehicle parks in the parking tower, and dedicated parking space (e.g., temporary parking space, parking spaces reserved for handicapped, women and children, compact cars, buses etc.).

In an embodiment, the parking space information is map information data obtained by image capturing and analyzing techniques or light detection and ranging (LiDAR) sensing techniques. A vehicle can be mounted with the sensing device 2 that is connected to the system 1. As a vehicle enters a parking field, the sensing device 2 senses and obtains the parking space information surrounding the vehicle to determine if there are available parking spaces. In an embodiment, a vehicle is not pre-loaded with parking lot map data, the sensing device 2 mounted on the vehicle senses the parking space information. In an embodiment, the sensing device 2 is an optical radar, which is called LiDAR in brief. LiDAR can sense a large range and is not affected when facing forward and backward. LiDAR has a laser matrix, which emits light, receives reflected light, and determines its intensity, to get to know the distance and intensity of an object (e.g., the intensity of light reflected from metal is great, and the reflection intensity can be compared and used to predict the object), and construct the parking space information surrounding the vehicle. In another embodiment, the sensing device 2 is an image sensor, which captures and analyzes images to construct the parking space information surrounding the vehicle.

The object analysis module 12 receives the parking space information from the parking space information module 11, and analyzes the objects in the parking spaces of the parking space information, to generate the object information of the object in the individual parking space. In an embodiment, the object analysis module 12 determines whether the individual parking space of the currently obtained parking space information has any object existing therein and generates corresponding object information. In another embodiment, an object, such as a vehicle, an obstacle or a pedestrian, exists in a parking space, the object will be determined based on its types, and the availability of the parking space is then determined.

In an embodiment, the object information is categorized into three types: a non-object, a static object and a dynamic object. The non-object indicates that a parking space is empty, and can be considered as an available parking space. The dynamic object indicates that the object analysis module 12 determines that a vehicle or a pedestrian is moving in a parking space, and the parking space is considered as an undetermined parking space, which will be determined if it will become an available parking space every a certain period of time. The static object indicates that the object in a parking space does not move for a period of time, and whether the object affects parking will be determined.

The processing module 13 receives the object information from the object analysis module 12. The processing module 13 uses the object information and the parking space information to calculate the object in the individual parking space and a spatial relationship of a parking space where the vehicle is located, and determines whether the parking space is an available parking space if the spatial relationship satisfies the vehicle body information of the vehicle. If the object information is categorized to be a static object, the disclosure, when determining whether the object in the parking space will affect parking, compares the space information of the object information and the parking space information to obtain their spatial relationship, which is also called a difference set, and determines that the parking space is an available parking space if the difference set satisfies the vehicle body information of the vehicle, which indicates that under a circumstance that the object exists available space divided from the parking space is still spacious enough for a vehicle to park therein. In an embodiment, the vehicle body information includes the length, width and height of the vehicle. How the space information of the object information and the parking space information are compared will be described in the following paragraphs.

Based on evaluation scores of available parking spaces, the processing module 13 chooses one of the available parking spaces that has the highest evaluation score as a chosen parking space. After determining that which of the parking spaces are available parking spaces, the processing module 13 evaluates the available parking spaces, gives each of the available parking spaces a corresponding evaluation score, and chooses one of the available parking spaces that has the highest evaluation score as the chosen parking space. In an embodiment, the evaluation scores are determined by considering a distance, time, parking grid type and parking grid location, which have their respective weights. In an embodiment, a parking space that is not suitable for a vehicle is excluded, another parking space that is suitable for the vehicle is chosen first, or a parking space within a certain region in the parking lot is chosen first. A distance from a vehicle to an available parking space and time for the driver of the vehicle to drive to the available parking space can also be considered. The weights can be set based on the driver's preference when a vehicle enters a parking lot. In an embodiment, one of a plurality of available parking spaces that has the highest evaluation score is chose as the final actual parking space. If the driver has no preference, he can choose one of the available parking spaces that he arrives first to be the final actual parking space.

The parking space information is used for the evaluation scores to set weights. In an embodiment, a vehicle can set parking space preference in advance, e.g., setting "temporarily parking" as the first, and "reserved for compact car" as the second, and if a parking space is for "temporarily parking," the parking space will have a high evaluation score and will be chose as a chosen parking space. If the parking lot map data is pre-loaded, the selection of the parking space can be conducted in its entirety.

In an embodiment, the parking space information is pre-loaded parking lot map data, the parking space information records unfit parking spaces, e.g., a parking space not matching the size of a vehicle, and the object analysis module 12 will not analyze the state of the object of the unfit parking space, which alleviates the operation burden of the system 1 for determining a parking space and reduces the load of the system 1.

Figure 2:
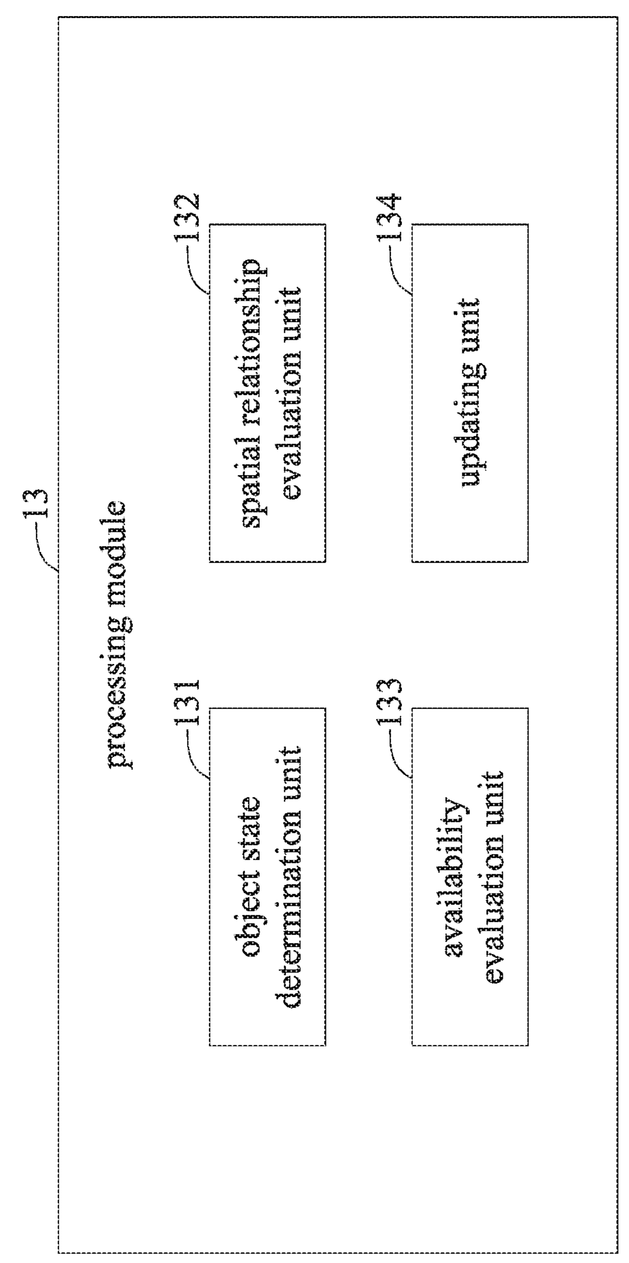
FIG. 2 is a functional block diagram of a processing module of a system for determining a parking space according to the disclosure.

FIG. 2 is a functional block diagram of the processing module 13 of the system 1 for determining a parking space according to the disclosure. The processing module 13 determines whether a parking space is available and the order of the available parking spaces. Since the parking space information can be updated at any time, the available parking spaces and their order must be adjusted in real time. In an embodiment, the processing module 13 comprises an object state determination unit 131, a spatial relationship evaluation unit 132, an availability evaluation unit 133 and an updating unit 134.

The object state determination unit 131 determines whether the object is a static object, a dynamic object or a non-object based on the object information.

The spatial relationship evaluation unit 132 identifies a spatial relationship based on the object information and the parking space information. In order to determine whether a parking space is available, when an object is in the parking space, the object has to be determined if it affects parking. The spatial relationship evaluation unit 132 analyzes and determines a spatial relationship between a parking space and an object based on the object information and the parking space information. In an embodiment, the spatial relationship evaluation unit 132 calculates the spatial relationship if the object information is classified to be a static object.

The availability evaluation unit 133 determines whether a parking space is an available parking space and gives an evaluation score to each available parking space. After the spatial relationship evaluation unit 132 determines the spatial relationship of individual parking space, the availability evaluation unit 133 determines whether a parking space is available. Availability means that a static object does not affect parking, a dynamic object is going to leave, or a non-object is determined. In an embodiment, the availability evaluation unit 133 classifies the object information to be a non-object or a static object, the spatial relationship satisfies the vehicle body information of a vehicle, and the parking space is determined as an available parking space. In another embodiment, the object information is classified to be a dynamic object, the parking space is determined to be an undetermined parking space, and the state of the parking space is updated continuously.

Then, the availability evaluation unit 133 evaluates all the available parking spaces, such that individual available parking space has a corresponding evaluation score. The availability evaluation unit 133 ranks the available parking spaces based on their evaluation scores.

Please be noted that as a vehicle moves in the parking lot continuously, the range where the vehicle will change accordingly, some parking spaces will be included, and some other parking spaces will be excluded. The disclosure keeps on receiving and determining the state of individual parking space, and calculates and ranks the evaluation scores of the parking spaces within the range where the vehicle is located, to find out a suitable parking space in the available parking spaces. As the vehicle moves, the processing module 13 keeps on calculating the evaluation scores of the parking spaces in real time, to find out the suitable parking space within a range where the vehicle is located as the chosen parking space.

In order to avoid the vehicle from waiting too long, the disclosure provides that if a vehicle waits for a parking space for a period of time, the target can be changed. In an embodiment, the updating unit 134 starts to choose another parking space if the vehicle waits for the chosen parking space for a period of time. In another embodiment, the object information is classified to be a dynamic object, the vehicle waits for the chosen parking space for a predetermined period of time, another available parking space will be chosen to be a newly chosen parking space based on new evaluation scores. When one of the available parking spaces is the chosen parking space, the vehicle will be guided to park in the chosen parking space. If the chosen parking space is in use, the evaluation scores will be calculated in real time continuously, to exclude the chosen parking space. If the chosen parking space is chose because it belongs to a dynamic object (e.g., a vehicle or a pedestrian, who stays in the parking space continuously), the updating unit 134 selects the best one of the new available parking spaces as a newly chosen parking space based on new evaluation scores (which will be updated continuously, even though the vehicle does not move) after determining that the vehicle waits for the chosen parking space for a period of time.

It is known from the above that the system 1 for determining a parking space according to the disclosure will obtain parking space information first, and then determines whether there is any object exists in the parking spaces. If there is at least one object existing in the parking spaces, the object will be determined if it affects parking, and an available parking space within a range where the vehicle is located will be found. Since individual parking space has its own evaluation score, after the currently available parking spaces are found, one of the available parking spaces that has the highest evaluation score will be chose as the final chosen parking space. Since the evaluation scores are calculated in real time continuously based on the parking spaces, as the vehicle moves, the evaluation scores of the parking spaces within a range where the vehicle is located will change accordingly, and the newest parking space state messages can be obtained. After the vehicle waits for the chosen parking space for a predetermined period of time, another parking space will be chosen.

Figure 3:
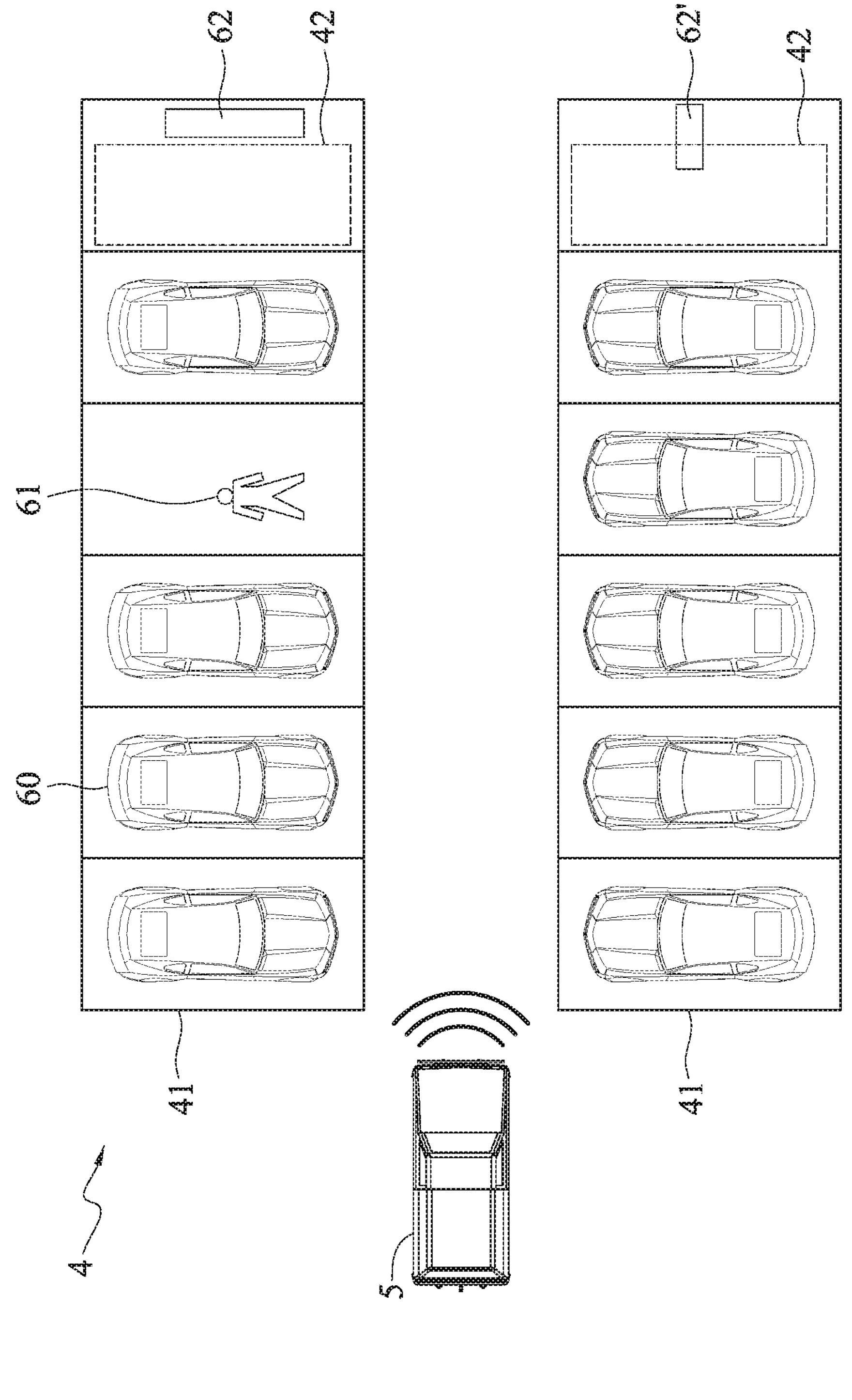
FIG. 3 schematically illustrates a vehicle entering a parking lot including a variety of parking spaces in a system for determining a parking space according to the disclosure.

FIG. 3 schematically illustrates a vehicle entering a parking lot including a variety of parking spaces in a system for determining a parking space according to the disclosure. Please also refer to FIGS. 1 and 2. After entering a parking lot 4, a vehicle 5 will obtain parking space information surrounding the vehicle 5 through pre-loaded parking lot map data or by sensing the surroundings. When moving, the vehicle 5 will sense the state surrounding the parking space 41. When an object, such as a vehicle, a person and an obstacle, exists in the parking space 41, the object will be classified. When the object is a dynamic object, such as a pedestrian 61, the parking space will be determined to be an undetermined parking space, which will be sensed continuously and be determined if it is available (the object has left) or unavailable (the object still stays in the parking space). If the undetermined parking space is chosen to be the chosen parking space, a waiting mechanism is executed. If the vehicle waits for the chosen parking space for a period of time, another parking space will be chosen. If the object is a static object (e.g., a vehicle 60 parking therein or an obstacle (an obstacle 62 or an obstacle 62') of any shape or at any location in the parking grid), the object will be further analyzed.

The system 1 for determining a parking space may include the vehicle body information of the vehicle 5, such as the length, width and height of the car. Two parking spaces on the upper and lower right side of FIG. 3 have obstacles existing therein, but the spatial relationships of the two obstacle 62 and 62' with the parking spaces are different. The obstacle 62 does not overlap with the vehicle space 42 of the vehicle body information of the corresponding vehicle 5, and a space excluding the obstacle 62 allows the vehicle 5, which has the vehicle space 42, to park therein. The vehicle space 42 will not be affected by the obstacle 62, and the above parking space will be determined to be an available parking space. The obstacle 62' overlaps with the vehicle space 42 of the vehicle body information of the corresponding vehicle 5, and a space excluding the obstacle 62' does not allow the vehicle 5, which has the vehicle space 42, to park therein. The vehicle space 42 needed by the vehicle 5 to park therein will be affected by the obstacle 62', and the below parking space will be determined to be an unavailable parking space. As the vehicle 5 keeps on moving, the system 1 for determining a parking space will determine a parking space state surrounding the vehicle 5 continuously, and find out the best parking space based on the evaluation scores of all available parking spaces.

Figure 4:
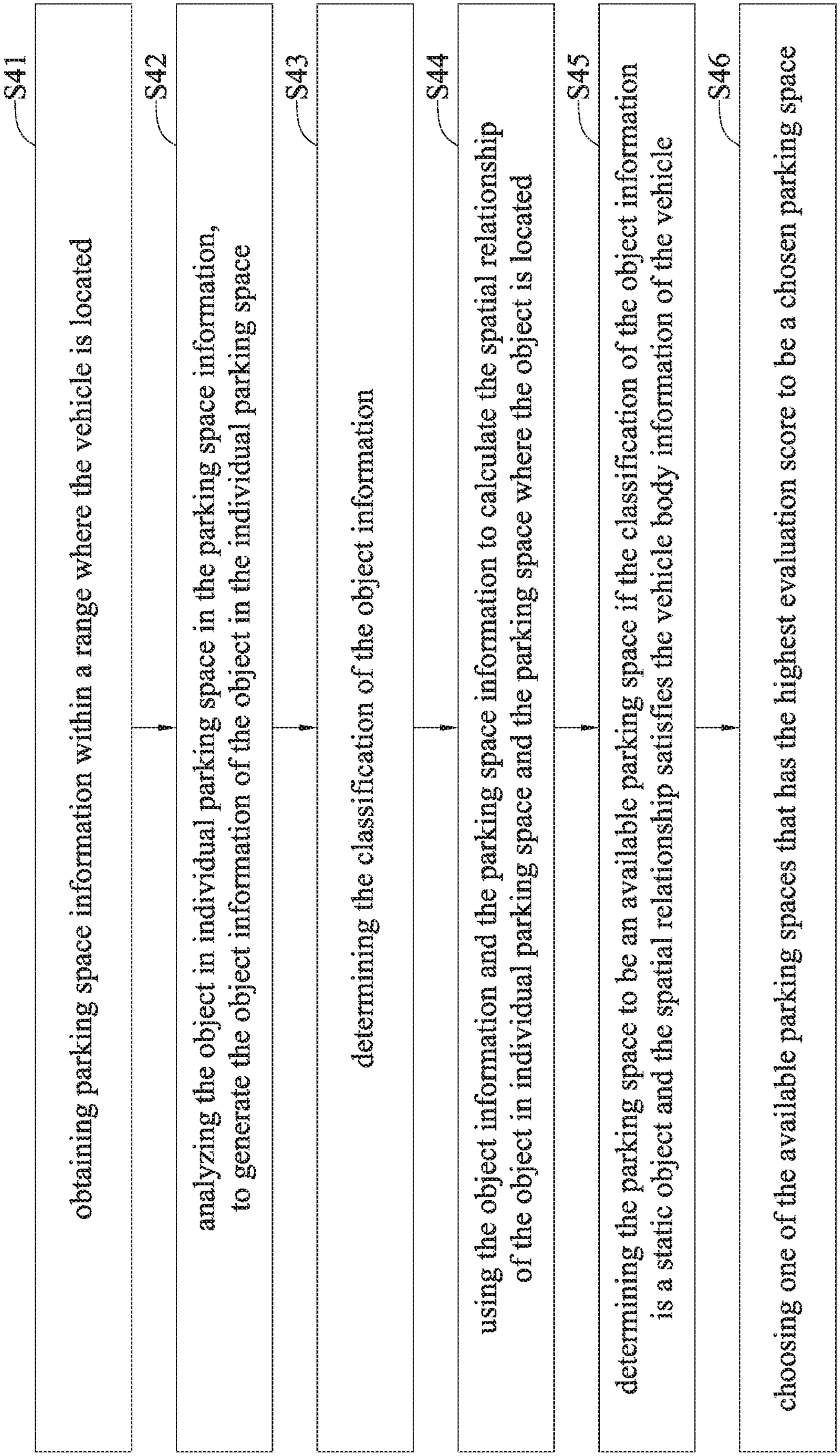
FIG. 4 is a flow chart of a method for determining a parking space according to the disclosure.

FIG. 4 is a flow chart illustrating a method for determining a parking space according to the disclosure. The method is used to determine whether the parking spaces surrounding a vehicle are available parking spaces, and choose one of them to allow the vehicle to park therein. In step S41, parking space information within a range where the vehicle is located is obtained. In step S41, the vehicle, when entering a parking lot and searching for a suitable parking space, first obtains parking space information of parking spaces surrounding the vehicle. The searching range of the vehicle takes the vehicle as its center, and whether these parking spaces are available is determined subsequently.

In an embodiment, the parking space information is pre-loaded parking lot map data. Through the pre-loading mechanism, the distribution state of all parking spaces in the entire parking lot and related information can be obtained, which is advantageous in analyzing the parking space information and the object information. The pre-loaded parking lot map data can be set with different weights. For example, some certain types of parking spaces, if being chose first, will have high evaluation scores. The pre-loaded parking lot map data allows the parking spaces to be chose in their entirety.

In an embodiment, the parking space information is map data obtained by image capturing and analyzing techniques or LiDAR sensing techniques. In an embodiment, the vehicle is mounted with a sensing device, such as LiDAR. The parking space information can be constructed surrounding the vehicle through the characteristics of LiDAR that can sense a large range and is not affected when facing forward and backward. In an embodiment, the sensing device 2 is an image sensor, which captures and analyzes images to construct the parking space information surrounding the vehicle.

In step S42, the object in individual parking space in the parking space information is analyzed, to generate the object information of the object in the individual parking spaces. In step S42, whether individual parking space in the parking space information obtained currently has an object existing therein. If an object, such as a vehicle, a pedestrian and an obstacle, exists in the parking space, the determination as to whether the parking space is an available parking space will be affected. In an embodiment, different determinations will be conducted based on the types of the object, including a non-object, a static object and a dynamic object, and object information will be generated lastly.

In an embodiment, the parking space information is pre-loaded parking lot map data, the parking space information also records unfit parking spaces, i.e., the parking space types that are not appropriate for the vehicle to park therein, e.g., a parking space that does not match the size of the vehicle, and in step S42 the object states of the unfit parking spaces will be excluded in advance and not be analyzed, which reduces the amount of system calculation.

In step S43, the classification of the object information is determined. In an embodiment, the object information is classified into a non-object, a static object and a dynamic object. According to the disclosure, the non-object is determined to be an available parking space and indicates that no obstacle and no vehicle is parking therein, and the parking space of this type is considered an available parking space. If an object is a dynamic object, which indicates moving vehicle or pedestrian, the object is a potential available parking space and is considered an undetermined parking space. The states of the parking spaces will be updated continuously, and the parking spaces will be determined if they are available. If the object is a static object, further confirmation has to be conducted.

In step S44, the object information and the parking space information are used to calculate the spatial relationship of the object in individual parking space and the parking space where the object is located. In step S44, the object information and the parking space information are used to calculate the spatial relationship of the object in individual parking space and the parking space where the object is located. In step S45, the parking space is determined to be an available parking space if the spatial relationship complies with the vehicle body information of the vehicle. In step S44, the spatial relationship of the object in individual parking space and the parking space where the object is located is calculated by comparing the space information of the object information and the parking space information to obtain the spatial relationship, which is called a difference set, and determining whether the difference set satisfies the vehicle body information of the vehicle. It is known from the above that when an object, especially a static object, is in a parking space, step S44 will be executed.

In step S45, if the classification of the object information is a static object and the spatial relationship satisfies the vehicle body information of the vehicle, the parking space is determined to be an available parking space. In step S45, if the difference set is determined to satisfy the vehicle body information of the vehicle, which indicates that the parking space is spacious enough for the vehicle to park therein, the parking space can be determined to be an available parking space.

In step S46, one of the available parking spaces that has the highest evaluation score is chose to be a chosen parking space. In step S46, after the available parking spaces are identified, one of the available parking spaces that has the highest evaluation score is chose to be the chosen parking space. In an embodiment, the evaluation scores are determined by considering a distance, time, parking grid type and parking grid location, which have their respective weights. The weights can be set based on the driver's preference when a vehicle enters a parking lot. In an embodiment, one of a plurality of available parking spaces that has the highest evaluation score is chose as the final actual parking space.

Please be noted that as a vehicle moves in the parking lot continuously, and the range where the vehicle will change accordingly. The disclosure keeps on receiving and determining the state of individual parking space, and calculates and ranks the evaluation scores of the parking spaces in the range where the vehicle is located, to find a suitable parking space in the available parking spaces.

Figure 5A:
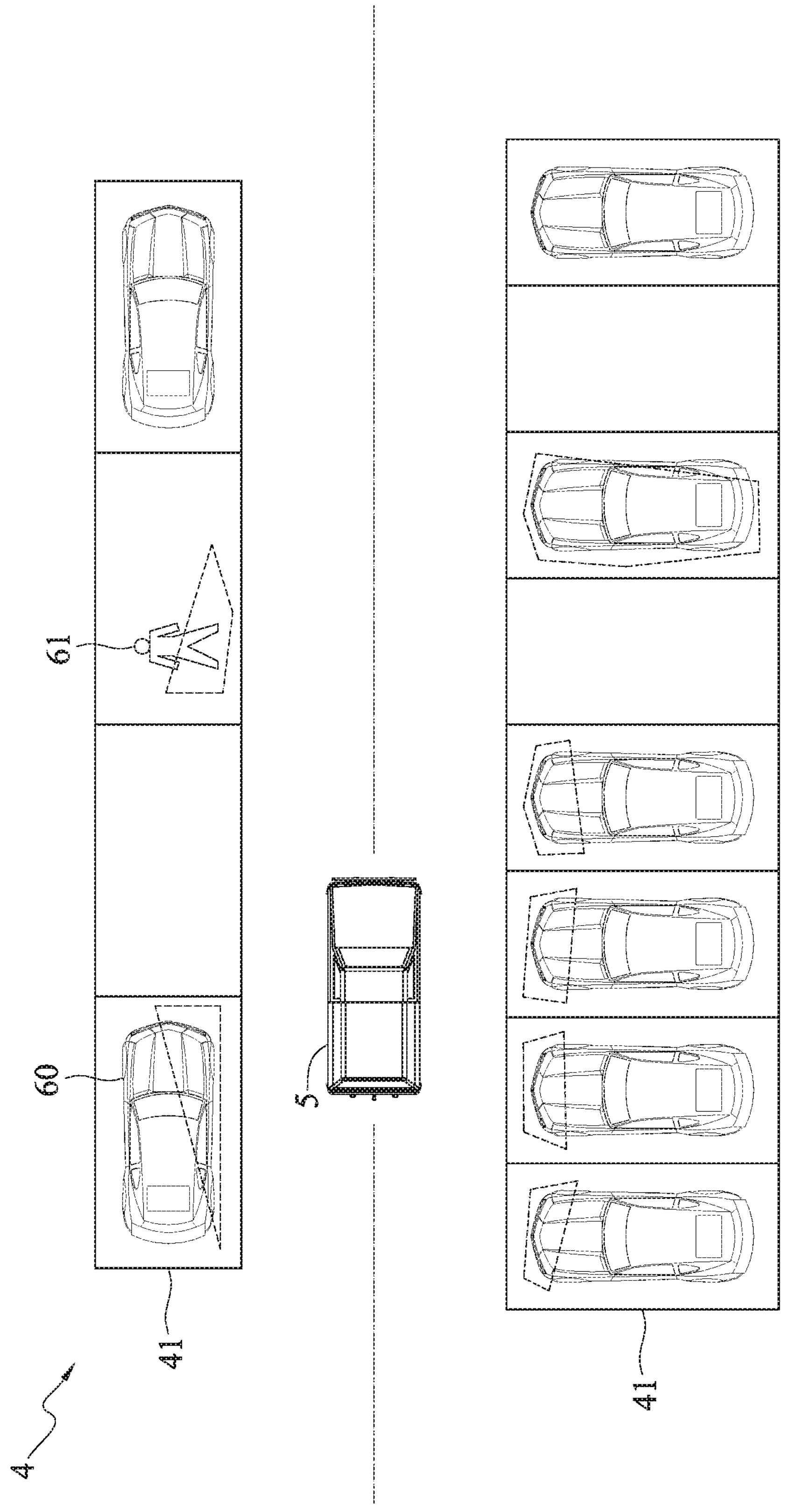
FIGS. 5A to 5C schematically illustrate determining a parking space according to the disclosure.
Figure 5B:
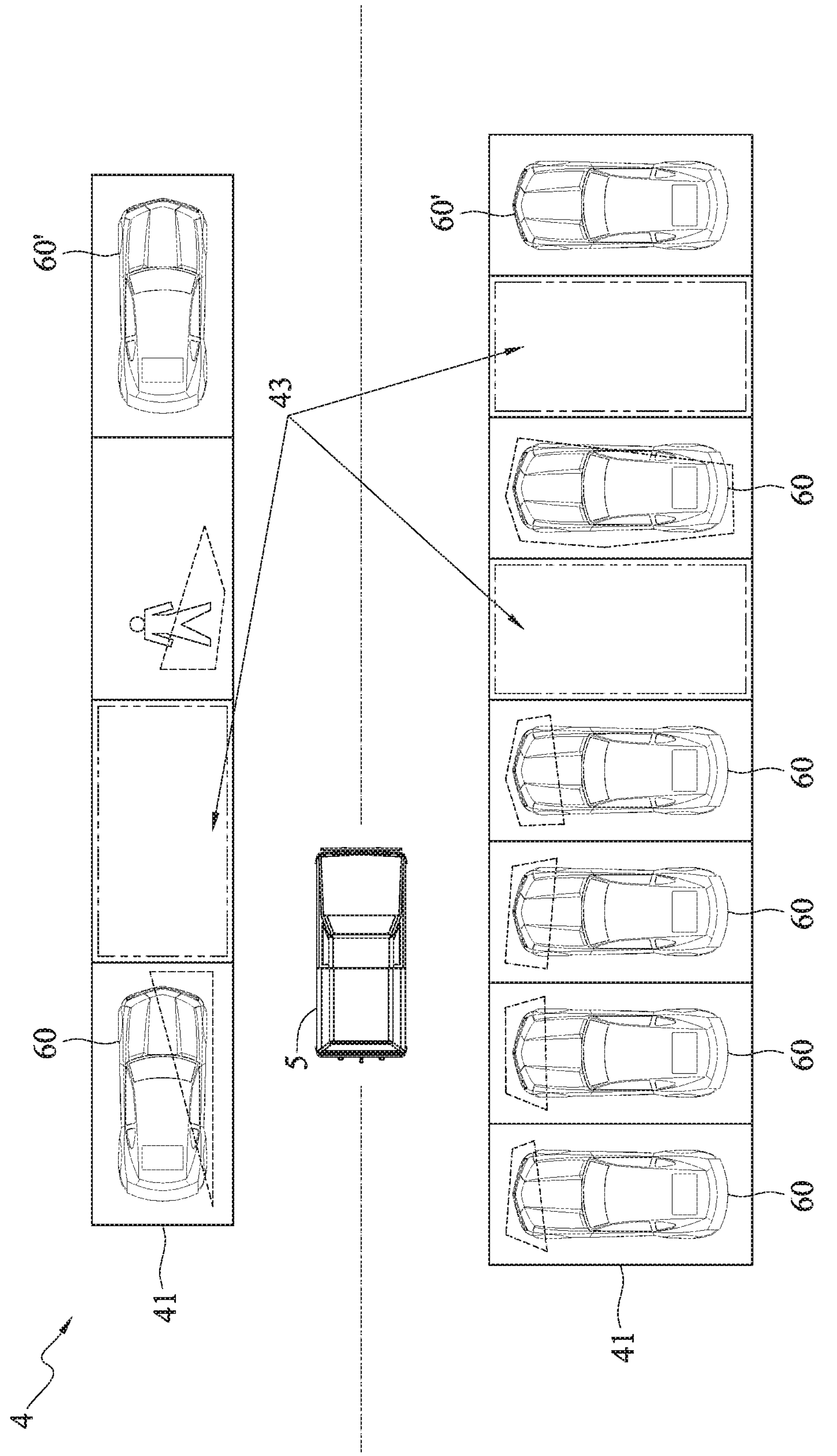
Figure 5C:
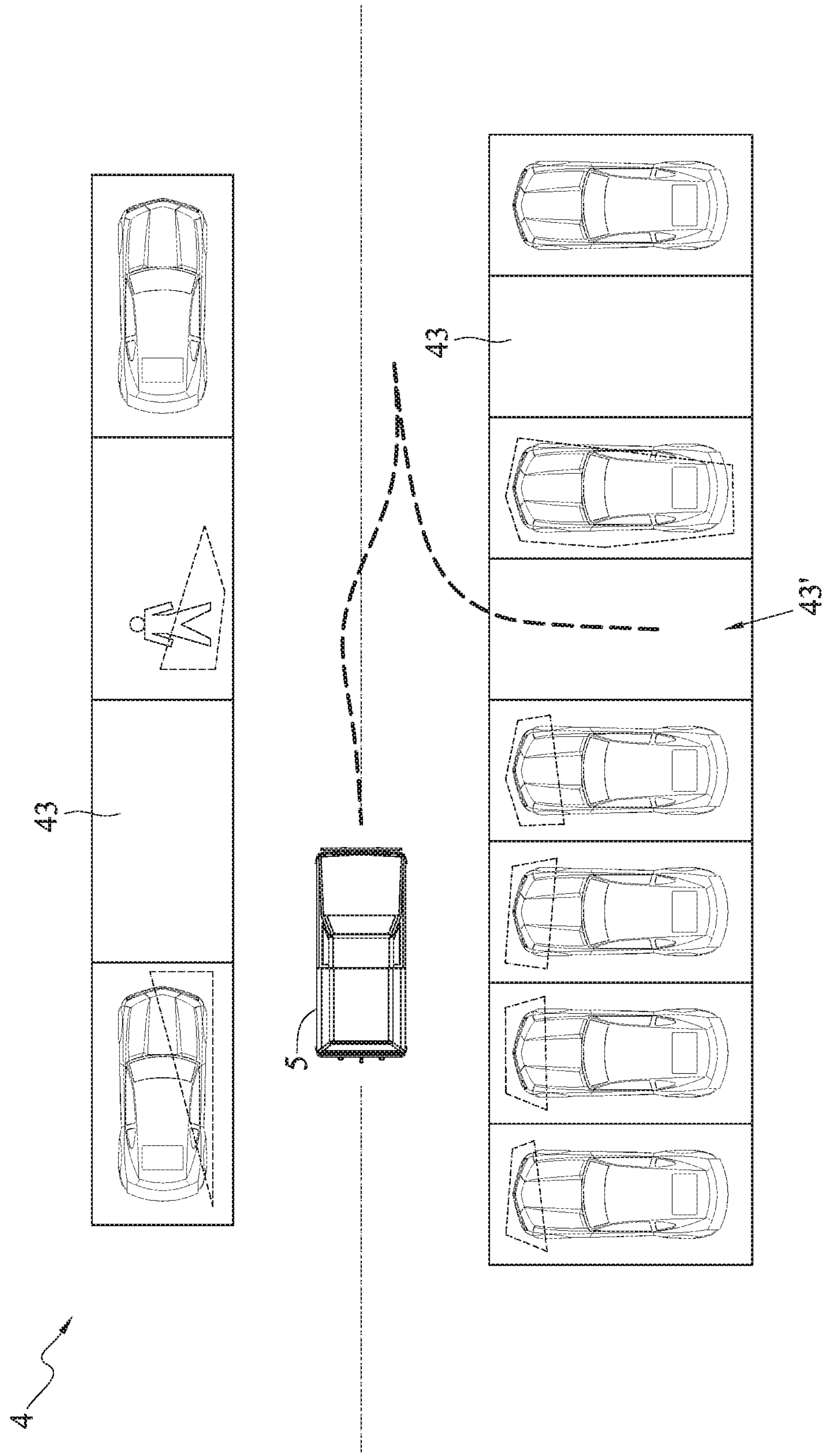

As the parking space information changes with time, moving vehicle and surrounding environment, if a parking space is chosen as a chosen parking space, the vehicle will drive to and park in the chosen parking space. In special circumstances, such as the chosen parking space being occupied in advance or a dynamic object (e.g., a vehicle or a pedestrian) still staying in the parking space, the disclosure will choose another available parking space as a newly chosen parking space based on new evaluation scores after the vehicle waits for the originally chosen parking space for a predetermined period of time. After the vehicle waits for the chosen parking space for a period of time, the evaluation scores of the surrounding parking spaces will change. Therefore, another better parking space will be chose based on the new evaluation scores FIGS. 5A to 5C schematically illustrate a method for determining a parking space according to the disclosure. As shown in FIG. 5A, the vehicle 5 is mounted with LiDAR or an image sensor. After entering the parking lot 4, the vehicle 5 obtains one or more parking space information through a visible range of LiDAR of an image sensor. In addition to the LiDAR and the image sensor, the vehicle 5 is pre-loaded with parking lot map data, to exclude unfit (too small or too low) parking spaces and obtain one or more parking space information. The information obtained by the LiDAR or the image sensor is analyzed to determine whether the parking space 41 within the range has any object therein, such as a vehicle 60 or a pedestrian 61.

As shown in FIG. 5B, the system uses an object geometry and parking grid geometry comparing method to determine whether the parking space 41 is potentially available. As the vehicle 5 will move continuously, the angle and range that each object, such as the vehicle 60 and the pedestrian 61, in the parking space 41 will change with time, and the pedestrian 61 and a portion of the vehicle 60 in the parking space 41 are denoted by a dotted block of an irregular shape, which indicates that the system can detect the state of the object, and a portion of the vehicle 60' is not detected by the vehicle 5. For the vehicle 60 in the parking space 41 at the upper left side of FIG. 5B, since the vehicle is big and a portion of the vehicle close to the channels will be detected, or since the body of the vehicle 60 in the parking space 41 will be detected (the third parking space from the lower right) because an empty parking space is beside the parking space 41, the system considers the dotted block as an object. Then whether parking will be affected by the object will be determined. The geometry shape constituted by the object is compared with the existing geometry shape of the parking space, to determine whether the object affects parking. The comparison of geometry shapes will be described in detail in FIGS. 6A to 6C.

Occupying state determination and priority state comparison can be used to determine whether a parking space is potentially available. In an embodiment, the occupying state determination includes determining the type of message of the object information. If the object information is a non-object, the parking space will be determined to be the available parking space 43. If the object is a dynamic object, such as a vehicle and a pedestrian, after the vehicle or the pedestrian leaves, the vehicle can park in the parking space, and the parking space is determined to be an undetermined parking space. As the vehicle moves, the parking space information of the parking space changes and is updated in real time. If the object is a static object, such as a vehicle or an obstacle, the spatial relationship between the object and the parking space should be further considered.

In considering the spatial relationship between the object and the parking space, the different sets of the object range and the parking range are compared, to determine whether a remaining space is spacious enough for a vehicle to park therein. The calculation of the spatial relationship between the object and the parking space includes determining a height, i.e., the height of the object, and comparing the height of the object with the height of a chassis in the vehicle body information. If the height of the object is greater than the height of the chassis of the vehicle, an unavailable parking space is determined. Some parking spaces that have a ground parking lock will be omitted based on related information of the vehicle (i.e., the vehicle body information), to avoid the ground parking lock from being considered as an obstacle that affects parking.

In an embodiment, the calculation of the spatial relationship between the object and the parking space includes determining a width or a length, i.e., the width and the length of the object, and comparing the width and the length of the object with the width and length of the parking space in the parking space information and the width and length of the vehicle body in the vehicle body information of the vehicle. If the width and length of the parking space in the parking space information and the difference set of the width and length of the object are less than the width and length of the vehicle body of the vehicle, the parking space is determined to be an unavailable parking space.

In another embodiment, the calculation of the spatial relationship between the object and the parking space includes comparing the location of the object with the location of parking space labelling line in the space information of the parking space. If a difference between the location of the parking space labelling line of the parking space and the location of the object is less than the length of the vehicle body in the vehicle body information, the parking space is determined to be an unavailable parking space.

Since LiDAR can sense a large range and is not affected when facing forward and backward, the parking space in use within the sensing range (including the rear portion) will be identified continuously, and be tracked if it has become an available parking space. If the parking space is determined to be a dynamic object, or even a non-object, the parking space will be further determined if it is an available parking space.

As shown in FIG. 5C, after a plurality of available parking spaces are found, one of the available parking spaces that has the highest evaluation score will be chose to be a chosen parking space 43' to be a final actual parking space. The vehicle 5 can plan the parking route to execute auto-pilot to assistant pilot to park in the chosen parking space 43'.

Figure 6A:
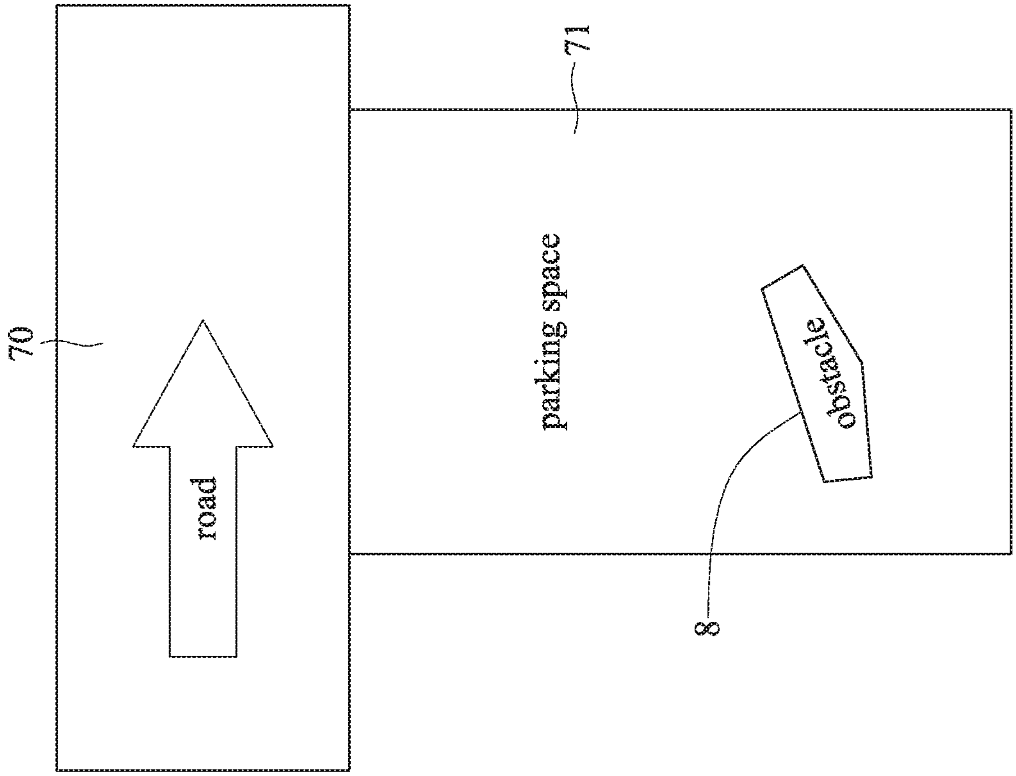
FIGS. 6A to 6C schematically illustrate calculating a difference set between object information and parking space information according to the disclosure.
Figure 6B:
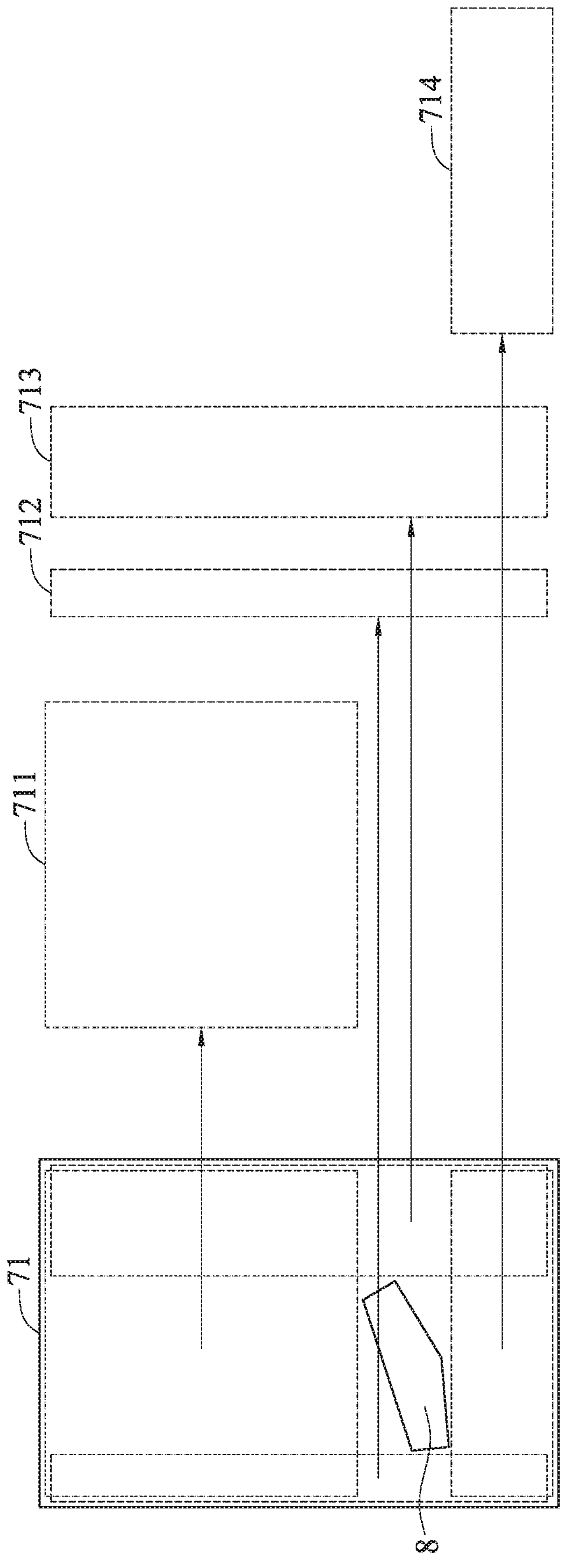
Figure 6C:
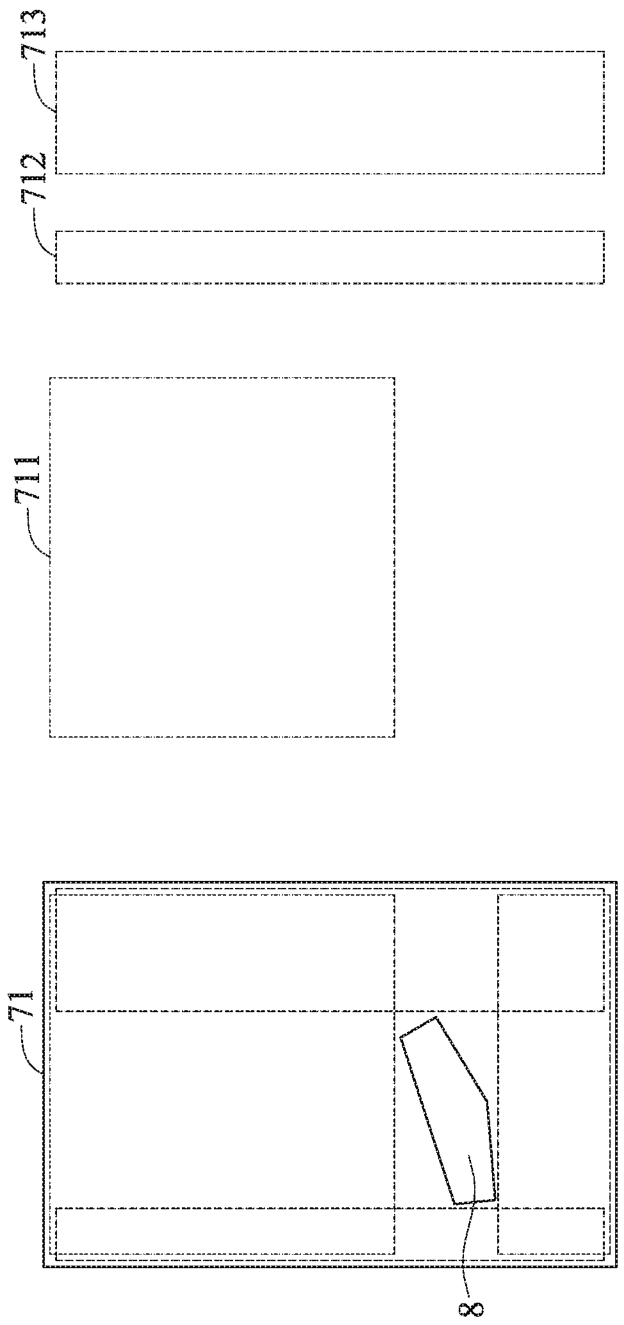

FIGS. 6A to 6C schematically illustrate calculating a difference set between object information and parking space information according to the disclosure. As shown in FIG. 6A, the traveling route of the parking lot is called a road 70, and a parking space 71 neighbors the road 70. When traveling within the range, the vehicle senses that an object of an obstacle 8 is in the parking space 71, whether the object affects parking will be determined, and different sets of the object information and the parking space information will be calculated.

As shown in FIG. 6B, the parking space 71 can be divided into four effective blocks based on the location of the obstacle 8. In an embodiment, the parking space 71 is divided into four blocks based on the relationship of the obstacle and the parking space surroundings. The first block 711 is the largest space of the obstacle 8 upward (neighboring the road). The second block 712 is the largest space of the obstacle 8 leftward. The third block 713 is the largest space of the obstacle 8 rightward. The fourth block 714 is the largest space of the obstacle 8 downward. Whether the four blocks have a vehicle parking therein will be determined.

As shown in FIG. 6C, although four blocks are found for a vehicle to park therein, the fourth block 714 will be excluded first, since it does not neighbor the road. If an obstacle is located at an end of the parking space closest to the road and prevents the vehicle from parking in the parking space, the fourth block 714, even if it is spacious enough for the vehicle to park therein, still does not allow a vehicle to park therein. Therefore, only the first block 711, the second block 722 and the third block 713 will be further considered. It is known from the above that blocks that neighbor the road will be chose first, and then which of the blocks that allow a vehicle to park therein will be determined.

The spatial relationship between the object (the obstacle 8) and the parking space 71 is determined. By comparing the sizes of the first block 711, the second block 712 and the third clock 713 with the width and length of the vehicle body in the vehicle body information of the vehicle, whether the blocks formed by dividing the parking space 71 allow a vehicle to park therein can be determined. If any block is spacious enough to allow a vehicle to park therein (i.e., the size of the block satisfying the size of the vehicle), the parking space will be determined to be an available parking space. If no block is spacious enough to allow a vehicle to park therein, the parking space is determined to be an unavailable parking space.

Figure 7:
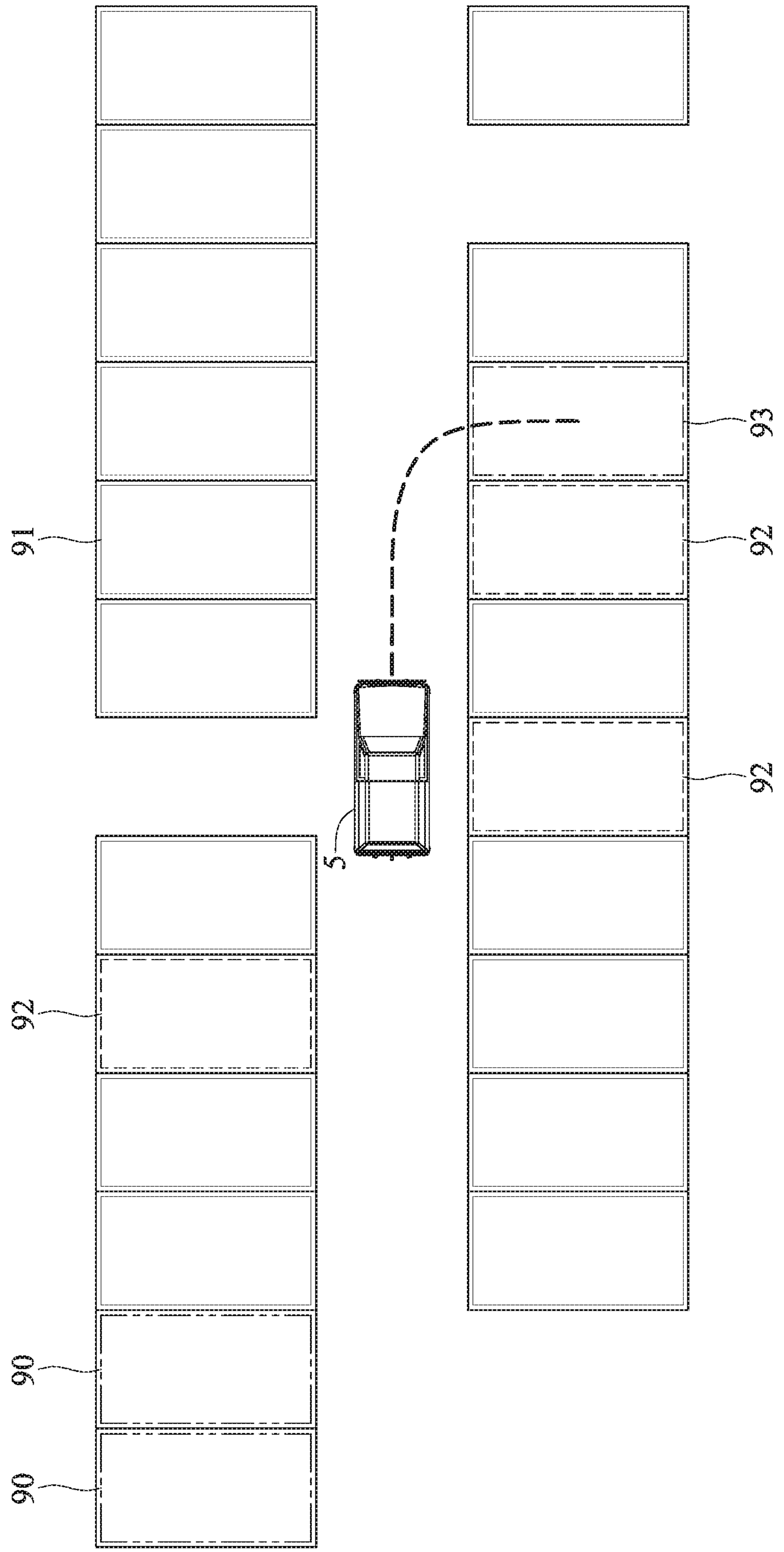
FIG. 7 shows a variety of parking spaces to which a system for determining a parking space according to the disclosure is applied.

FIG. 7 shows a variety of parking spaces to which a system for determining a parking space according to the disclosure is applied. The method for determining a parking space according to the disclosure can be applied to a variety of parking lots, such as a planer parking lot, a parking tower, a mechanical parking garage, a roadside parking lot etc. Individual parking space will be given its own evaluation score, which can be weighted. The method for determining a parking space according to the disclosure can display the state of individual parking space in real time. A parking space 90, which is not within a range where the vehicle 5 is located, is not detected, while a parking space 91, which is within the range, will be detected. The system detects the parking space 91 and determines that the parking space 91 is an unavailable parking space. The system detects a parking space 92 and determines that the parking space 92 is an available parking space. The system detects a parking space 93, and determines that the parking space 93 is a chosen parking space 93, which has the highest evaluation score among all the available parking spaces (including the parking spaces 92 and 93).

As the vehicle 5 moves, the range encompassed by a sensing device mounted on the vehicle 5 will change accordingly, and the state of individual parking space within the range where the vehicle 5 is located can be determined in real time. Accordingly, the parking space state represented in the system for determining a parking space according to the disclosure will change, which indicates that the states of the parking spaces 90 to 93 change with time. For convenience, line changes are used to indicate the state difference of the parking spaces. The parking space states can be displayed on a displaying device in the vehicle with different color (e.g., yellow, red and green), and the driver can get to know the states of the parking spaces surrounding the vehicle intuitively.

In the disclosure, the module, device and apparatus include a microprocessor or a memory, algorithms, data and programs are stored in a memory or chip, and a microprocessor loads data, algorithm or programs from a memory to analyze and calculate data. The modules and units of the system for determining a parking space according to the disclosure include a microprocessor and a memory, and can analyze and calculate data. The hardware structures of the module, unit and apparatus disclosed by the disclosure can be realized by the same manner.

In the system and method for determining a parking space according to the disclosure, the parking space information within a range with a vehicle is located is obtained, whether an object exists in the parking spaces is determined, and one of available parking spaces that has the highest evaluation score is chose as a chosen parking space. As the vehicle moves, the evaluation scores of the parking spaces change, and a better parking space can be found. According to the disclosure, a plurality of parking spaces can be determined if they are available or if an object affects the use of the parking spaces. Therefore, the search efficiency is improved. A plurality of available parking spaces can be determined based on certain conditions, and be tracked at the same time. Therefore, the problems of the prior art that a vehicle has to a position close to a parking space before the parking space is determined to be available and a better parking space cannot be found in a parking lot on demands are solved.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A system for determining a parking space, comprising:

a parking space information module configured for obtaining parking space information within a range where a vehicle is located, the parking space information comprising parking lot map data;

an object analysis module configured for receiving the parking space information, analyzing an object within individual parking space in the parking space information, and generating object information of the object within the individual parking space; and a processing module configured for receiving the object information, using the object information and the parking space information to calculate a spatial relationship between the object within the individual parking space and a parking space where the object is located, and determining that the parking space is an available parking space if the spatial relationship satisfies vehicle body information of the vehicle, wherein the parking space is divided into blocks based on location of the object, and the spatial relationship is determined by comparing sizes of the blocks.

2. The system of claim 1, wherein the processing module comprises:

an object state determination unit configured for determining whether the object is a static object, a dynamic object or a non-object;

a spatial relationship evaluation unit configured for determining the spatial relationship based on the object information and the parking space information; and an availability evaluation unit configured for determining whether the parking space is the available parking space.

3. The system of claim 2, wherein the spatial relationship evaluation unit calculates the spatial relationship if the object is determined to be the static object.

4. The system of claim 2, wherein the availability evaluation unit determines that the parking space is the available parking space if the object is determined to be the non-object or the static object and the spatial relationship satisfies the vehicle body information of the vehicle.

5. The system of claim 2, wherein the availability evaluation unit determines that the parking space is an undetermined parking space and continues updating a state of the parking space if the object is determined to be the dynamic object.

6. The system of claim 2, wherein the availability evaluation unit evaluates and ranks all the available parking spaces and chooses one of the available parking spaces that has a highest evaluation score to be a chosen parking space.

7. The system of claim 6, wherein the processing module further comprises an updating unit configured for choosing another of the available parking spaces as a newly chosen parking space based on new evaluation scores if the vehicle waits for the chosen parking space for a predetermined period of time.

8. The system of claim 1, wherein the parking lot map data is pre-loaded from an external map data module or obtained through a sensing technique.

9. The system of claim 8, wherein the parking space information is pre-loaded parking lot map data, the parking space information records unfit parking spaces, and the object analysis module does not analyze an object state of the unfit parking spaces.

10. A method for determining a parking space, comprising:

obtaining parking space information within a range where a vehicle is located, the parking space information comprising parking lot map data;

analyzing an object in individual parking space in the parking space information and generating object information of the object of the individual parking space; and using the object information and the parking space information to calculate a spatial relationship between the object in the individual parking space and a parking space where the object is located, and determining that the parking space is an available parking space if the spatial relationship satisfies vehicle body information of the vehicle, wherein the parking space is divided into blocks based on location of the object, and the spatial relationship is determined by comparing sizes of the blocks.

11. The method of claim 10, wherein the spatial relationship is calculated if the object is determined to be a static object.

12. The method of claim 10, wherein the object is determined to be a non-object or a static object, the spatial relationship satisfies the vehicle body information of the vehicle, and the parking space is determined to be the available parking space.

13. The method of claim 10, wherein the object is determined to be a dynamic object, the parking space is determined to be an undetermined parking space, and a state of the parking space continues to be updated.

14. The method of claim 10, wherein after the available parking space is determined, all the available parking spaces are evaluated and ranked, and one of the parking spaces having a highest evaluation score is chosen.

15. The method of claim 14, further comprising after the vehicle waits for the chosen parking space for a predetermined period of time, another of the available parking spaces is chosen as a newly chosen parking space based on new evaluation scores.

16. The method of claim 10, wherein the parking lot map data is pre-loaded or obtained through a sensing technique.

17. The method of claim 16, wherein the parking space information is pre-loaded parking lot map data, the parking space information records unfit parking space, and an object state of the unfit parking spaces is not analyzed.

* * * * *